United States Patent [19]

Hatakeyama et al.

[11] Patent Number: 4,752,865
[45] Date of Patent: Jun. 21, 1988

[54] POWER SOURCE DEVICE FOR CIRCUIT BREAKER

[75] Inventors: Yoshihiro Hatakeyama; Ichirou Arinobu, both of Fukuyama, Japan

[73] Assignee: Mitsubishi Denki Kabushiki Kaisha, Japan

[21] Appl. No.: 55,535

[22] Filed: May 29, 1987

[51] Int. Cl.$^4$ .............................................. H02M 3/28
[52] U.S. Cl. ..................................... 363/89; 363/126; 307/38
[58] Field of Search ...................... 363/85, 86, 89, 126; 323/266; 307/38, 39

[56] References Cited

U.S. PATENT DOCUMENTS 4,677,537 6/1987 Chonan .................. 363/126

FOREIGN PATENT DOCUMENTS 0185160 10/1984 Japan ..................................... 363/89
0223475 11/1985 Japan ..................................... 307/38
2073973 10/1981 United Kingdom .

Primary Examiner—Patrick R. Salce
Assistant Examiner—Kristine Peckman
Attorney, Agent, or Firm—Leydig, Voit & Mayer

[57] ABSTRACT

A power source device for a circuit breaker responsive to a current output of a current detection circuit having a capacitor chargeable to provide a voltage output and a switching circuit for switching between charging and discharging states of the capacitor. A dummy burden is connected to the switching circuit and set at a substantially equal burden formed by a load and a constant voltage generating circuit to eliminate fluctuations in the charging and discharging states of the capacitor. As a result, accuracy in the detected current output is substantially improved without the use of a high-capacitance and high-withstand-voltage capacity.

3 Claims, 2 Drawing Sheets

POWER SOURCE DEVICE FOR CIRCUIT BREAKER

BACKGROUND OF THE INVENTION

This invention relates to a power source device for operating an electronic circuit for monitoring quantities of electricity flowing through a circuit breaker.

FIGS. 2 and 3 show a prior-art power source device for a circuit breaker disclosed in Japanese Patent Application Laid-open No. 150920/1975. Referring to FIG. 2, which is a block diagram of the power source device an input current Im is a rectified current of the current flowing through each phase of the circuit breaker. A current sensing circuit 715 applies the input current Im to a switching circuit 710, and it converts the current Im into a voltage Vc and applies the voltage to a microcomputer 154 as a current sensing signal. The switching circuit 710 is controlled by a voltage sensing circuit 708 sensing the voltage Vc to change the output of the current sensing circuit 715 into the voltage by switching between contact 1, which is connected to an energy storing capacitor 704, and contact 2, which is connected to a bypass circuit 714. The energy storing capacitor 704 smooths the input current Im and stores the energy in the form of the voltage Vc. A D.C./D.C. converter 706 is connected to the energy storing capacitor for obtaining a constant voltage output on the basis of the voltage Vc stored by the energy storing capacitor 704.

If the output voltage Vc of the energy storing capacitor 704 based on the input current Im is not greater than a predetermined voltage, for example, 39 V, the voltage sensing circuit 708 throws the switching circuit 710 to the contact 1, and the input current Im charges the energy storing capacitor 704. When the output voltage Vc exceeds the predetermined voltage, the switching circuit 710 is changed-over to the contact 2, so that the input current Im is bypassed by the bypass circuit 714. An example of the bypass circuit 714 is shown in FIG. 3. In the figure, the bypass circuit 714 is a chopper circuit constructed of an FET. As described above, the voltage sensing circuit 708 receives the output Vc and has a hysteresis characteristic to operate the switching circuit 710 on the basis of the predetermined voltage. The D.C./D.C. converter 706 is also controlled by the voltage sensing circuit 708 so as to turn ON and OFF for supplying and interrupting a voltage on the basis of the output voltage Vc and predetermined voltages (for example, ON at 37 V and OFF at 33 V).

Since the prior-art power source circuit for the circuit breaker provides a voltage on the basis of the switching between the ON and OFF states of the D.C./D.C. converter and the charging and discharging of the energy storing capacitor, a capacitor of high capacitance and high withstand voltage is required. In addition, a wide variation in the output impedance of the current sensing circuit due to the charging and discharging of the energy storing capacitor and the switching of the switching circuit 710 (in general, the bypass circuit is of low impedance) effects the accuracy of the detected current.

SUMMARY OF THE INVENTION

Accordingly, it is an object of the present invention to provide a power source device for a circuit breaker capable of supplying a constant voltage to a load without affecting the accuracy of the detected input current irrespective of a wide variation in the device impedance due to fluctuations in the charging and discharging of the energy storing element. To achieve this objective, a dummy burden substantially equalized with a burden resulting from the series arrangement of the load and a constant voltage generating circuit is utilized to effectively maintain the burden of the energy storing element constant.

DESCRIPTION OF THE PREFERRED EMBODIMENT

Figure 1:
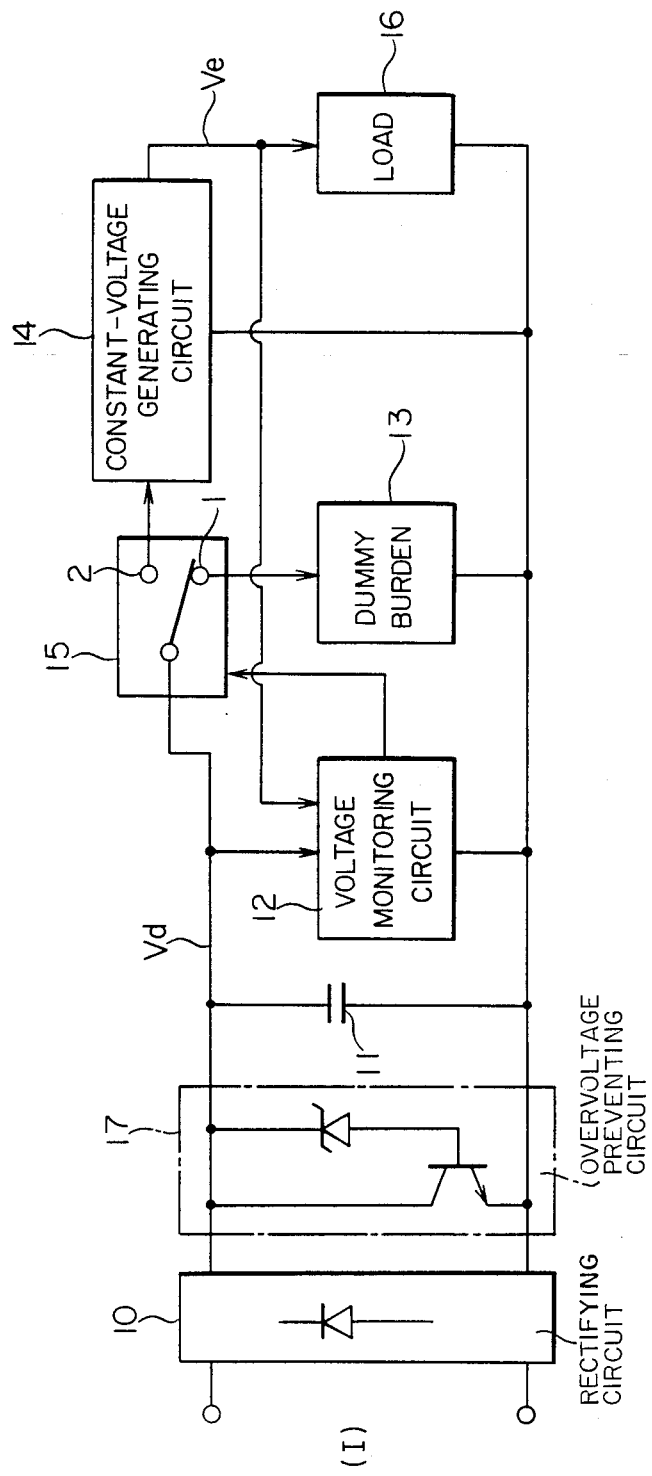
FIG. 1 is a block diagram showing an embodiment of this invention.
Figure 2:
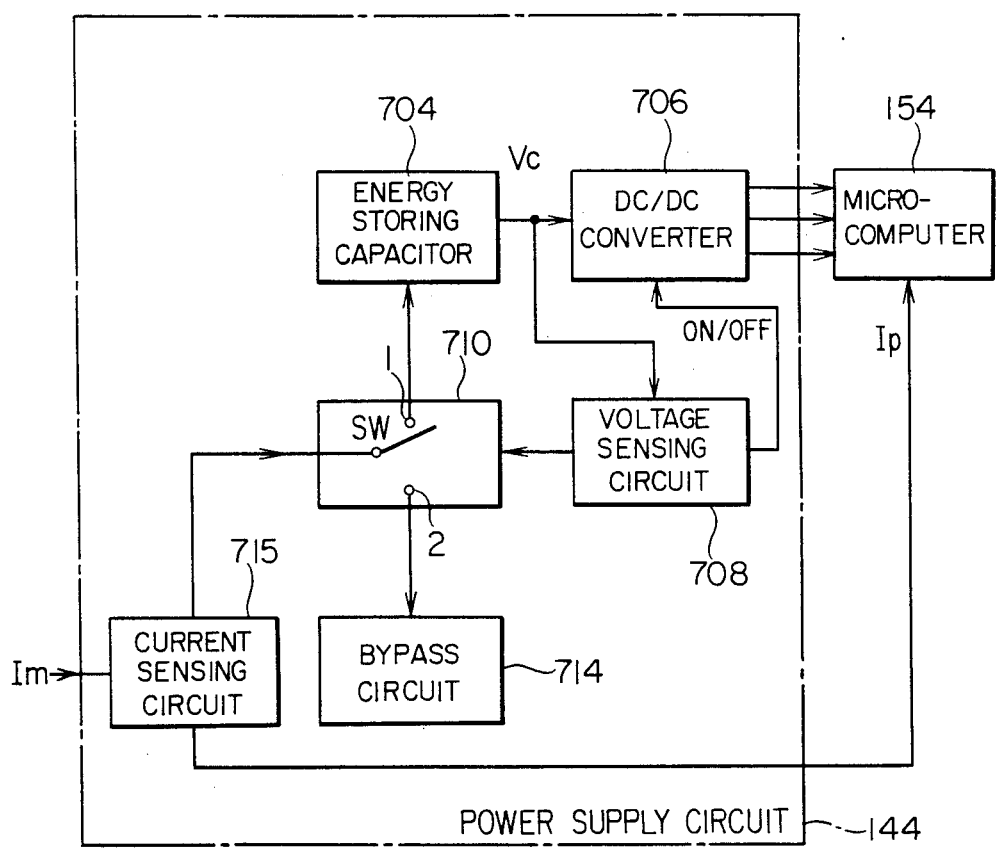
FIG. 2 is a block diagram of a prior-art example.
Figure 3:
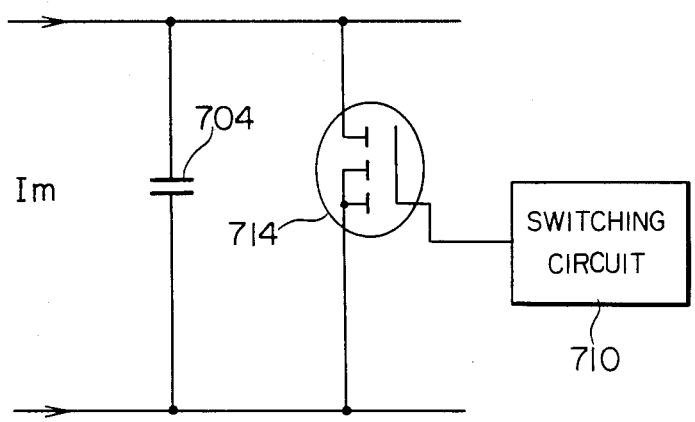
FIG. 3 is a circuit diagram showing the details of a bypass circuit in the prior-art example.

FIG. 1 shows an embodiment of this invention. Referring to the figure, a rectifying circuit 10 rectifies a current I detected by a current detection means such as a current transformer, not shown. An overvoltage preventing circuit 17 is operatively connected in parallel with the rectifying circuit 10 to protect the power source device from damage when a high voltage exceeding a predetermined voltage has been delivered from the rectifying circuit 10. A capacitor 11 is connected in parallel with the rectifying circuit 10 and the overvoltage preventing circuit 17. A voltage monitoring circuit 12 is connected so as to monitor the terminal voltage of the capacitor 11 and a voltage to be fed to a load 16. A switching circuit 15 is controlled by the voltage monitoring circuit 12 to switch between contacts 1 and 2. A dummy burden 13 is connected to the contact 1, while a constant-voltage generating circuit 14 is connected to the contact 2. The output terminal of the constant-voltage generating circuit 14 is connected to the power source terminal of the load 16 such as a microcomputer.

Next, the operation of the embodiment will be described. The secondary output of the current transformer, not shown, which detects the current flowing through the power source device is rectified by the rectifying circuit 10 and is charged in the capacitor 11. If the charged voltage Vd is not greater than a predetermined voltage, for example, 8 V, the voltage monitoring circuit 12 controls the switching circuit 15 to switch to the contact 1, position and the capacitor 11 is charged with its burden, i.e., the dummy load 13. When the charged voltage Vd has exceeded the predetermined voltage the switching circuit 15 is switched to the contact 2 position, so that the charged voltage Vd is applied to the constant-voltage generating circuit 14. The constant-voltage generating circuit 14 generates an output voltage Ve at a constant value even when the charged voltage Vd changes. In the above case, the constant value is set at 5 V by way of example. This constant voltage Ve is fed to the load 16. The voltage monitoring circuit 12 changes-over the switching circuit 15 to the contact 1 when the output voltage Ve has lowered down to a voltage of 4.5 V below which the load 16 fails to operate normally. As described above, the voltage monitoring circuit 12 monitors both the charged voltage Vd and the output voltage Ve at all times and changes-over the switching circuit 15 properly. On this occasion, the dummy burden 13 is substantially equalized to a burden due to the series circuit of the constant-voltage generating circuit 14 and the load 16. More specifically, letting $I_2$ denote a current which flows via the contact 2 when the charged voltage at the changeover of the switching circuit 15 is expressed by $Vd_1$, the dummy burden is set at a value equal to a resistance R which is obtained according to $R=Vd_1/I_2$. Then, when the switching circuit 15 has been changed-over, the burden of the capacitor 11 does not substantially change, and the change of the charged voltage of the capacitor 11 can be restrained to zero or a minimal value. In a case where the constant-voltage generating circuit 14 and the load 16 are not formed of a pure resistance but have an impedance based on a capacitance or/and an inductance, the dummy burden 13 is similarly configured so as to include the impedance. In the above case, accordingly, both the burdens are set so as to become substantially equal.

According to this invention, the burden of the capacitor 11 is always constant, so that when the switching circuit 15 has been changed-over, the change of the charging or discharging of the capacitor 11 is negligibly small and has no influence on the detected current I of the current detection means and the input thereof. Accordingly, even in a case where detection means for measurement, etc. are connected to the current detection means, the detected results thereof are not adversely affected and can maintain high precisions. Moreover, since the change of the charged voltage of the capacitor 11 is small, a capacitor of low withstand voltage can be used, and the circuit arrangement can be rendered small in size and low in cost.

What is claimed is:

1. A power source device for a circuit breaker responsive to a detection means, said power source device comprising:
   rectification means for rectifying an output of the detection means;
   smoothing means for smoothing an output of said rectification means;
   a switching circuit for receiving said rectified output by way of said smoothing means for alternately applying said output to first and second output terminals;
   a dummy burden connected to said first output terminal of said switching circuit;
   a generating circuit connected to said second output terminal of said switching circuit for providing constant voltage to said circuit breaker; and
   a voltage monitoring circuit responsive to at least one of the output voltages of said generating circuit and said rectification means for controlling the position of said switching circuit;
   said dummy burden having a value substantially equal to a value of a total burden of said generating circuit and said circuit breaker.

2. A power source device for a circuit breaker as defined in claim 1, wherein said dummy burden has an impedance.

3. A power source device for a circuit breaker as defined in claim 1, wherein said current detection means includes means for obtaining a signal for current measurement.

* * * * *